United States Patent [19]

Masters et al.

[11] Patent Number: 4,970,796
[45] Date of Patent: Nov. 20, 1990

[54] SELF SUPPORTING SPIRIT LEVEL TOOL

[76] Inventors: James C. Masters, 795 Highview Ave., Glen Ellyn, Ill. 60137; Thomas K. Stevens, 14 Valley Dr., Orinda, Calif. 94563

[21] Appl. No.: 395,074

[22] Filed: Aug. 17, 1989

[51] Int. Cl.⁵ .............................................. G01C 9/28
[52] U.S. Cl. ...................................... 33/347; 33/370; 33/372; 33/373
[58] Field of Search .................. 33/370, 371, 372, 373, 33/347, DIG. 1

[56] References Cited

U.S. PATENT DOCUMENTS

| | | | |
|---|---|---|---|
| 1,111,677 | 9/1914 | Schade | 33/370 |
| 1,153,760 | 9/1915 | Butler | 33/370 |
| 1,630,601 | 5/1927 | Berscheid et al. | 33/370 |
| 1,767,335 | 6/1930 | Wilcox | 33/370 |
| 2,624,953 | 1/1953 | Newcomb | 33/372 |
| 3,057,074 | 10/1962 | Sidwell | 33/370 |
| 3,180,036 | 4/1965 | Meeks | 33/381 |
| 3,296,708 | 1/1967 | Moody | 33/381 |
| 3,545,091 | 12/1970 | Sebastiani | 33/372 |
| 3,707,772 | 1/1973 | Cotter | 33/373 |
| 3,820,249 | 6/1974 | Stone | 33/347 |
| 3,826,013 | 7/1974 | Baher | 33/373 |
| 3,832,782 | 9/1974 | Johnson et al. | 33/88 |
| 4,168,578 | 9/1979 | Vander Werf | 33/347 |
| 4,343,093 | 8/1982 | Eadens | 33/373 |
| 4,532,718 | 8/1985 | Copeland | 33/390 |

FOREIGN PATENT DOCUMENTS

| | | | |
|---|---|---|---|
| 2157433 | 2/1967 | Switzerland | 33/373 |
| 417982 | 10/1985 | United Kingdom | 33/371 |

Primary Examiner—Thomas B. Will
Attorney, Agent, or Firm—Harris Zimmerman

[57] ABSTRACT

A tool for abutment against an object to detect when the object is at a predetermined orientation is temporarily securable to the object in order to free both of the operator's hands for other activities. Plural spirit level vials, oriented to face in different directions, indicate when the tool is vertical, horizontal or inclined at one or more predetermined angles. In the preferred form, the tool body has a central handle region from which arms extend in opposite directions and a pair of members extend laterally from the end of each arm to define segments of a right angled slot into which the object is fitted. The tool preferably has three different types of fastener including retractable nail-like pins which may be penetrated into wood or the like, elastic cords which may be used to clasp the object and magnets which cause the tool to cling to steel posts, pipes or the like.

11 Claims, 2 Drawing Sheets

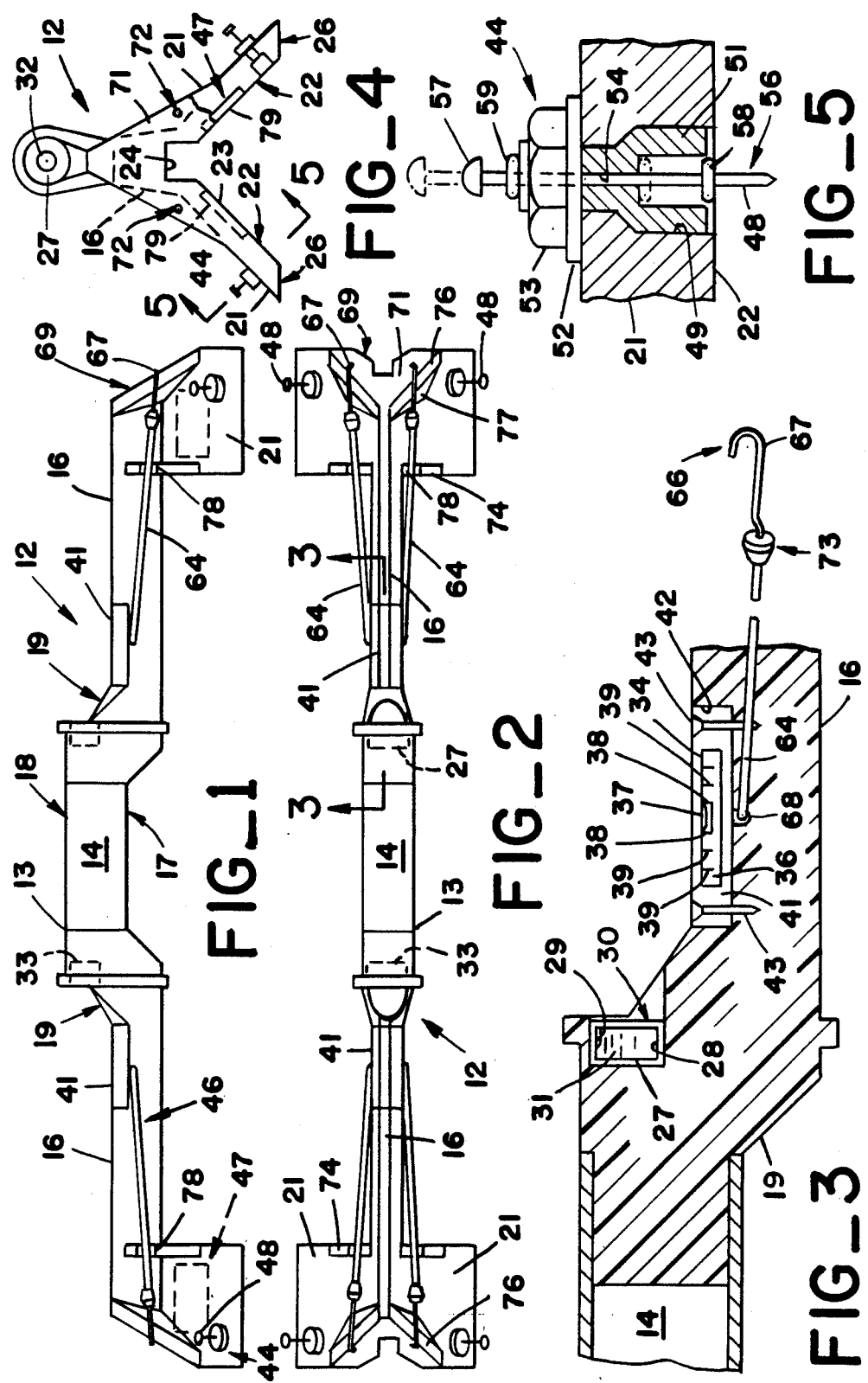

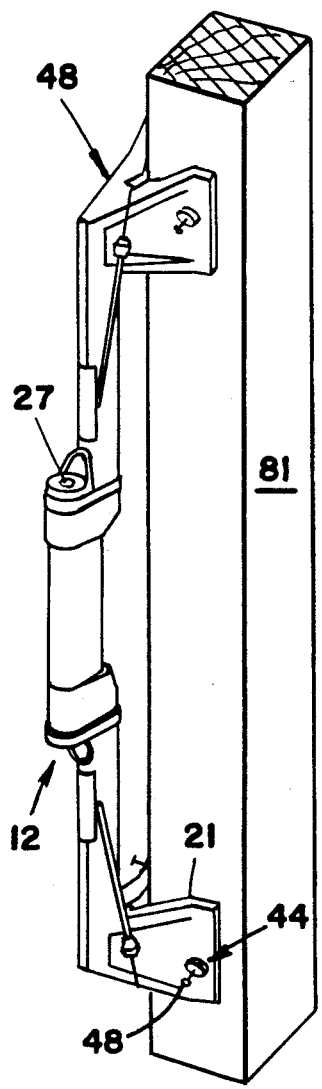
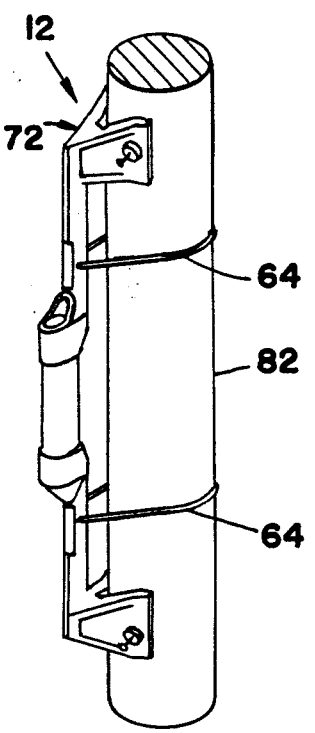
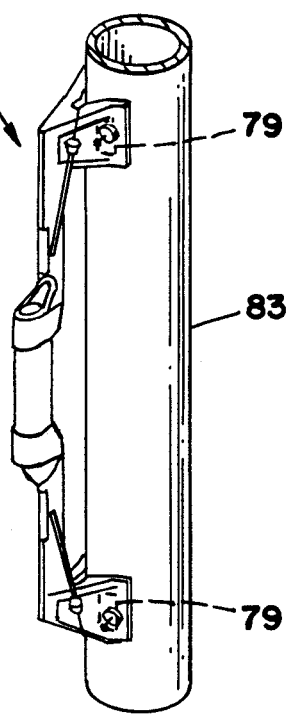
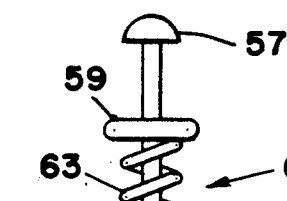
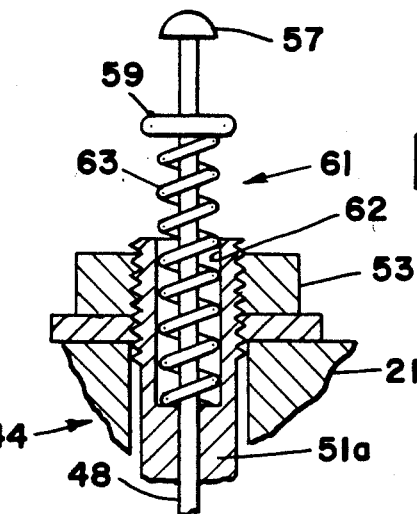
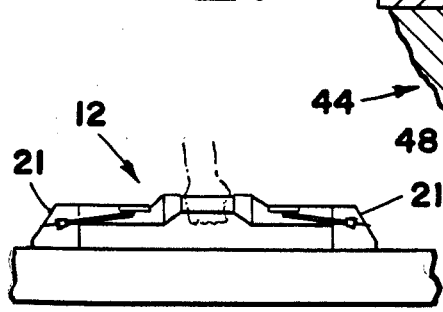

SELF SUPPORTING SPIRIT LEVEL TOOL

TECHNICAL FIELD

This invention relates to tools for sensing the orientation of objects such as posts, pipes or structural members and more particularly to leveling tools of the type which may be abutted against an object and which have one or more bubble vials for indicating when the object is in a horizontal or vertical position or at some particular degree of inclination.

BACKGROUND OF THE INVENTION

The traditional leveling tool used by carpenters, machinists, construction workers and others has an elongated, essentially rectangular body and a transparent vial containing liquid and a bubble. The bubble centers at a marked location on the vial when the tool is in a horizontal orientation and thereby indicates that a surface against which the tool is abutted is in a level condition. One or more orthogonally positioned vials are usually provided so that the tool may also be used to indicate when an object is in a strictly vertical orientation. Some leveling tools can also be adapted to indicate when an object, such as a length of drain pipe for example, has a desired inclination or grade.

Use of the conventional leveling tool under many conditions requires that it be continually gripped and supported by one of the operator's hands. This is necessary, for example, when the tool is used to plumb a vertical object such as a post or to level an overhead structural member. Continuous gripping of the tool is also required when it is used to level, plumb or grade objects having a curved surface, such as cylindrical pipes, posts or columns, or when the object is narrower than the tool itself.

Typically, other operations must be performed while the leveling tool is held in abutment with an object and these can be exceedingly difficult to perform with only one free hand. As one specific example, the setting of fence posts requires support and manipulation of the post itself and then securing of the base of the post while the leveling tool is held against the post to assure that it is installed in a strictly vertical orientation. Problems are further compounded in that the traditional leveling tool must be applied to one position on the post and then be shifted ninety degrees around the circumference of the post to assure that it is coincident with both of two orthogonal vertical planes. As a practical matter, repeated repositioning of the tool and manipulations of the pole may be needed to bring it into an exactly vertical alignment. Preferably such a tool should enable one step plumbing of objects without repositioning of the tool.

Under some conditions the leveling tool can be strapped to the post or other object that is to be plumbed or leveled but at best this has required time consuming complications. Consequently, it is a common practice in construction projects to involve more than one worker in the operations. This is a cost inefficiency and it is a solution that is not available to a person who is working alone.

It would be highly advantageous if the leveling tool were self supporting thereby freeing both hands of an operator for other activities. This has heretofore been accomplished in the case of tools designed for plumbing, leveling or grading steel objects by mounting magnets in the tool. Such magnetized tools are not self supporting on other types of material such as wood, plastic, concrete or the like.

Conventional leveling tools are also subject to other problems. For example, reading of the bubble vials may be difficult when the tool is held in certain positions. Gripping of the tool during use can be somewhat awkward as the operator's fingers cannot extend around the surface of the tool which is abutted against an object. In situations where both of the operator's hands can be freed by resting the tool on a flat horizontal object, it remains subject to displacement if the object is moved.

The present invention is directed to overcoming one or more of the problems discussed above.

SUMMARY OF THE INVENTION

In one aspect, this invention provides a self supported tool for assuring that an object has a predetermined orientation. The tool has an elongated body with a linear slot of angled cross sectional configuration at one side of the body into which a portion of the object may be received when the body is abutted against the object. At least one spirit level vial is secured to the body and has means for indicating when the slot is at the predetermined orientation. First fastening means provide for temporarily securing the body to the object by penetration of fasteners into the object.

In another aspect of the invention, the tool includes second fastening means for temporarily securing the body to the object by clasping the object.

In another aspect of the invention, third fastening means provide for securing the body to ferromagnetic objects. The third fastening means include magnetized material secured to the body in the region of the slot.

In a further aspect of the invention, a second spirit level vial is secured to the body and has means for indicating when the slot is at a second orientation that is orthogonal to the predetermined orientation. In a preferred form, the second spirit level vial includes means for visually indicating predetermined degrees of inclination of the slot enabling use of the tool to orient objects at a predetermined grade relative to horizontal.

In still another aspect of the invention, a self supporting plumbing tool for abutment against an object to determine if the object is in a predetermined orientation has an elongated body with a linear slot of angled cross section at one side into which a portion of the object may be received when the tool is abutted against the object. A spirit level vial is secured to the body and is positioned to indicate when the slot is at the predetermined orientation. A least one elastic cord extends from the body and has means for securing the end of the cord to clasp the tool to the object.

In still a further aspect, the invention provides a self-supported level, plumb and grading tool for indicating when an object is in a horizontal orientation or a vertical orientation or is inclined at a predetermined angle. An elongated body has a linear central handle region and co-linear arms which extend from opposite ends of the handle region. Each of the arms has a pair of members that extend laterally from the end of the arm at right angles to each other and which jointly define a slot into which a portion of the object may be received, each of the members being transpierced by a pin passage. A first spirit level vial is secured to the body and oriented to indicate when the slot is vertical. A second spirit level vial is oriented to indicate when the slot is horizontal and has means for indicating when said slot has at least one predetermined inclination relative to horizontal. A plurality of pins each extend through a separate one of the passages of the arm members and are movable relative to the passages in order to be selectively penetratable into the object to hold the body on the object. At least one magnet is secured to the body adjacent the slot and a pair of elastic cords each extend from a separate one of the arms and have means for securing the end of the cord to cause the cord to clasp the object.

The invention is a highly versatile tool which can temporarily fasten to a surface which is to be plumbed, leveled or graded thereby freeing both hands of the operator for other activity. In the preferred form, the tool has retractable nail-like pins enabling temporary fastening to penetratable surfaces such as wood, magnetic fasteners for clinging to objects formed of steel or other ferromagnetic material and elastic cords with hooks on the ends which may be used to clasp the tool to objects formed of any kind of material. In the preferred configuration, the tool has a pair of members at each end that extend laterally at right angles to each other and which define spaced apart segments of a slot of angled cross section. The slot defines a right angled surface for abutment against square posts or the like or for receiving round posts or the like that enables plumbing to be accomplished in one operation without repositioning of the tool. A central handle region is offset from other portions of the tool enabling it to be securely grasped including at times when the tool is abutted against a surface which is to be plumbed, leveled or graded.

Further aspects and advantages of the invention will be apparent from the following description of a preferred embodiment and the accompanying drawings.

BRIEF DESCRIPTION OF THE DRAWINGS

FIG. 1 is a side view of a level, plumb and grading tool in accordance with the preferred embodiment of the invention.

FIG. 2 is a view of the tool of FIG. 1 taken at right angles to the plane of FIG. 1.

FIG. 3 is a section view of a portion of the tool taken along line 3—3 of FIG. 2.

FIG. 4 is an end view of the tool of the preceding figures.

FIG. 5 is another section view of a portion of the tool taken along line 5—5 of FIG. 3.

FIG. 6 is a section view illustrating a modification of the structure depicted in FIG. 5.

FIG. 7 is a perspective view depicting use of the tool for plumbing an upright post and employing a first mode of fastening the tool to the post.

FIG. 8 is a perspective view depicting use of the tool for plumbing a post while employing a second mode of fastening of the tool to the post.

FIG. 9 is another perspective view illustrating a third mode of fastening the tool to a post which is to be plumbed.

FIG. 10 is an elevation view illustrating use of the tool to check the level of a flat horizontal surface.

FIG. 11 is an elevation view illustrating use of the tool for grading a drainage pipe which is being laid in a trench.

DETAILED DESCRIPTION OF THE PREFERRED EMBODIMENTS

Referring initially to FIGS. 1 and 2 of the drawings in conjunction, a level, plumb and grading tool 12 in accordance with this embodiment of the invention has an elongated body 13 with a tubular central handle region 14 and a pair of colinear arms 16 which extend in opposite directions from opposite ends of the handle region. Handle region 14 preferably has a somewhat flattened COnfiguration and is narrower along the inside edge region 17 than it is at the outside edge region 18 thereby enabling comfortable and secure gripping of the tool 12 by an operator's hand.

The ends 19 of arms 16 which connect to the handle region 14 of the tool are preferably angled to cause the handle region to be offset from the longitudinal axis of the arms. This provides for secure and comfortable gripping of the tool 12 at times when it is abutted against an object as it provides ample clearance for the operator's fingers to extend around the handle region 14 between the object and the tool.

Handle region 14 and arms 16 may be an integral element if desired and the tool 12 may be formed of any of various materials but are non-integral components in this embodiment to provide a light weight but high strength construction. In particular, with reference to FIG. 3, handle region 14 is a hollow extrusion of light metal such as aluminum. Arms 16 are formed of high strength plastic and the ends of 19 of the arms extend into the handle region and are secured thereto by adhesive.

Referring jointly to FIGS. 2 and 4, a pair of angled members 21 extend laterally from the outer end of each of the arms 16 and have flat inner surfaces 22 that are oriented at right angles to each other. The surfaces 22 define spaced apart segments of a slot 23 of right angled cross sectional configuration into which an edge region of a rectangular object or some or all of a cylindrical object may be received as will hereinafter be described in more detail. A groove 24 extends along each arm 16 at the regions where the surfaces 22 would otherwise intersect. This assures firm seating of the surfaces 22 against two orthogonal sides of rectangular structural members including in instances where the edge formed by the intersection of the sides may have some irregularity. The end surfaces 26 of all four members 21 are coplanar and lie in a plane that is parallel to arms 16. Thus arms 16 extend in parallel relationship to any flat surface against which all four members 21 are abutted.

Referring to FIGS. 3 and 4, a first spirit level vial 27 is disposed in a conforming recess 28 in one end of handle region 14 and faces towards the outer end of the adjacent one of the arms 16 so that the device may be used to detect when the groove 24 is in a vertical orientation. Vial 27 may be of the so-called bullseye type which is of circular shape and which has a convex transparent face 30 through which a bubble 29 in a body of liquid 31 may be viewed. Bubble 29 indicates when the tool 12 is vertical by centering within a circular marking 32 on face 30.

Referring to FIG. 1, a second similar but oppositely facing spirit level vial 33 is preferably disposed at the opposite end of handle region 14. This enables verticality to be detected with the tool 12 either above or below the operator's eye level without requiring reversal of the tool if it is changed from one such location to the other or if the operator should change positions.

Vials 27 and 33 equip the tool 12 for plumbing or establishing a vertical alignment of structural members. One of a pair of additional spirit level vials 34 is secured to each arm 16 to indicate a level or horizontal orientation of the groove 24. Referring to FIG. 3 in particular, each of the the spirit level vials 34 may be of the known transparent tubular type which contains a liquid 36 and a bubble 37 that centers between markings 38 when the groove 24 is horizontal. To enable use of the tool 12 for grading as will hereinafter be described in more detail, each of the spirit level vials 34 preferably has additional markings 39 at the areas where the bubble 37 locates when groove 24 is at one or more predetermined inclinations relative to horizontal.

Providing a vial 34 on each arm 16 enables level to be checked without reversing the tool 12 in instances where the tool is moved from one side of the operator to the other or where the operator changes position.

Each vial 34 in this embodiment is embedded in a protective body 41 of hardened transparent plastic which fits into a notch 42 in the outer edge of the arm 16 and which is secured to the arm by screws 43. This enables easy replacement of the vial 34 if that should be necessary.

Referring to FIG. 1, tool 12 is provided with first, second and third means 44, 46, and 47 for temporarily securing the tool body 13 to an object which is to be plumbed, leveled or graded. While a single arrangement of this type can be used in special purpose tools, the providing of plural means 44, 46 and 47 greatly increases versatility of the tool 12 by enabling fastening of the tool to objects formed of different materials and having different configurations.

The first such fastening means 44 secures the tool 12 in place by penetration of nail-like fasteners or pins 48 into the object against which the tool is abutted. This is highly suitable for use on unfinished lumber or other penetrable material in instances where the resulting small holes can be tolerated. In the simplest form, this mode of attachment can be accomplished by providing one or more nail holes in each of the angled members 21 through which the operator may temporarily drive ordinary nails when the tool 12 is to be fastened to an object. Preferably the pins 48 are extendible and retractable components of the tool 12 that remain attached to the tool at all times.

In this embodiment, with reference jointly to FIGS. 4 and 5, each angled member 21 is transpierced by a stepped passage 49 in which a similarly stepped bushing 51 is seated. The smaller diameter end of bushing 51 is threaded and extends outward a distance from the side of member 21 that is opposite from object abutment surface 22. A washer 52 and nut 53 engage on the outwardly extending end of the bushing to secure it to member 21. Pin 48 extends through a stepped axial passage 54 of bushing 51 and is movable along the passage between an extended position at which a pointed end 56 of the pin extends from surface 22 and a retracted position at which the pointed end is withdrawn into the passage. The opposite end of pin 48 has an enlarged head 57, preferably of rounded configuration, which may be struck with a hammer or the like to drive the pin into an object which abuts surface 22.

A first flange 58 on pin 48 seats against the step within bushing passage 49 when the pin is at the retracted position, indicated by dashed lines in FIG. 5, to prevent withdrawal of the pin from the tool. A second flange 59 on the pin 48 seats against the small end of bushing 51 when the pin is at the extended position and thereby limits the extent of penetration of an object. Flange 59 is spaced a small distance from head 57 to facilitate extraction of the pin 48 from an object by use of the claws of a carpenter's hammer or similar nail extraction tool.

When the tool 12 is first emplaced against an object, the movement acts to shift pins 48 to the retracted positions if the pins are not already at that position. Referring to FIG. 6, it can be advantageous under some circumstances if means 61 are provided for holding each pin 48 at the retracted position when it is not in use. This avoids scratching of the finish on objects and inhibits snagging of nearby material when the tool is moved about. For this purpose, the bushing 51a can be provided with a well 62 extending into the end of the bushing on which nut 53 is engaged. A compression spring 63, which is coaxial with pin 48, is seated in well 62 and acts against flange 59 in a direction which urges the pin towards the retracted position. The construction of the pin fastener means 44 can otherwise be similar to that previously described with reference to FIG. 5.

Referring to FIGS. 1, 2 and 3, the second means 46 for temporarily fastening tool 12 to objects includes a pair of elastic cords 64 having means 66 for enabling clasping of the tool body 13 to an object by use of the cords. The cords 64 may be of the so-called shock cord type and means 66 in this embodiment are wire hooks 67 secured to the ends of the cords. Each cord 64 extends through one of a pair of transverse passages 68 in tool body 13 which passages are situated in separate ones of the arms 16.

Passages 68 are preferably of smaller size than the hooks 67 to prevent withdrawal of the cords 64 through the passages and the passages are preferably notches in arms 16 located immediately under the clear plastic members 41 in which spirit level vials 34 are embedded. This enables replacement of cords 68 by loosening screws 41 and temporarily removing members 41.

Referring jointly to FIGS. 2 and 4, the outer end 69 of each arm 16 and adjoining angled members 21 preferably has an end surface 71 which slants back towards handle region 14 and a hook engaging hole 72 is provided adjacent each side of each such surface 71. The hooks 67 at the ends of cords 64 are engaged in holes 72 when the cords are not in use. Each cord 64 has a length which causes the cord to be slightly stretched when the hooks 67 are engaged in holes 72. This holds the cords 64 taut against the sides of the tool body 13 and thereby inhibits snagging of the cords on nearby objects when the tool 12 is moved about.

Hooks 67 have coiled ends 73 which encircle enlargements at the ends of cords 64 in order to couple the hooks to the cords. Snagging of the cords 64 and hooks 67 is further inhibited by situating the hook engaging holes 72 at locations which cause the enlarged coiled ends 73 to rest in the angles at the junctions of arms 16 and members 21. Webs 74 and 76 formed on the tool body 13 extend along each side of the locations of the coiled ends 73 thereby forming recesses 77 at the sides of the tool 12 in which the hook coils 73 are situated. The innermost web 76 has a notch 78 through which the cord 64 extends.

Referring to FIGS. 1 and 4, the third means 47 for temporarily fastening the tool 12 to an object enables the tool to be self-supporting on objects which are formed of steel or other ferromagnetic material. A flat magnet 79 is embedded in the inner surface 22 of each of the angled members 21 and in effect forms a portion of the surface.

The above described configuration of the tool 12 and the availability of several different forms of self attachment to objects makes the tool highly versatile and particularly useful where a single person is performing plumbing, leveling or grading operations.

Referring to FIG. 7, for example, a post 81 formed of wood or other penetratable material may be plumbed to assure verticality while both hands of the operator are free to manipulate the post and other tools that may be needed to set the post. The angled members 21 are abutted against two orthogonal faces of the post and pins 48 are driven into the post with a hammer. The tool 12 is then self-supporting and immobilized on the post 81 until such time as the pins are retracted in the manner hereinbefore described.

Repositioning of the tool 12 in the course of plumbing the post 81 is unnecessary as the tool seats against two orthogonal faces of the post and the bullseye spirit level vials 27 simultaneously indicate verticalness in two mutually perpendicular planes.

Referring to FIGS. 1 to 8, the tool 12 may also be temporarily fastened to a post 82 by means of the elastic cords 64 which mode of operation is particularly useful where the post is formed of material such as metal or concrete that cannot be penetrated by pins 48. Hooks 67 are disengaged from holes 72 and cords 64 are wrapped around post 82 and tensioned after which the hooks may be engaged with each other. The cords may be coiled around post 82 more than once if necessary to establish sufficient tension in the case of small diameter posts. An additional cord or the like may be engaged with cords 64 in order to encircle larger objects.

Referring to FIG. 9, magnets 79 cause the tool 12 to inherently cling to objects formed of ferromagnetic material such as a steel pipe 83.

Referring to FIG. 10, the tool 12 is not limited to use with post-like objects that can be fitted between angled members 21 and the tool can be hand held and used in the manner of a conventional carpenter's level if desired. As one example, the tool 12 can simply be rested on a broad flat surface 84 in order to determine if the surface is level.

Referring jointly to FIGS. 3 and 11, the supplementary graduations 39 on spirit level vial 34 enable use of the tool 12 for establishing a predetermined grade or inclination of an object such as, for example, lengths of drainpipe 84 which are being laid at the base 86 of a ditch. Seating of the upper portion of the drainpipe between the pairs of angled members 21 acts to self-align the tool 12 with the pipe. For clarity of illustration, the drainpipe 84 is shown in FIG. 11 with a greater inclination than is typical of such installations. In practice, the vial markings 39 may for example be located to indicate gradings which drop one eighth and one fourth inch in one foot although markings indicative of other gradients may also be beneficial. As in the case of plumbing and leveling operations, the tool 12 may temporarily secured to the drainpipe 84 such as by the elastic cords 64 thereby freeing both of the operator's hands for manipulation of the pipe and other tools.

While the invention has been described with respect to a particular embodiment for purposes of example, many modifications and variations of the tool construction are possible and it is not intended to limit the invention except as defined in the following claims.

We claim:

1. A self-supported tool for assuring that an object has a predetermined orientation, comprising:

an elongated body having a linear slot of angled cross sectional configuration at one side into which a portion of said object may be received when said body is abutted thereagainst, at least one spirit level vial secured to said body and having means for indicating when said slot is at said predetermined orientation, first fastening means for temporarily securing said body to said object by penetration of fasteners into said object, second fastening means for temporarily securing said body to said object by clasping said object said second fastening means including at least one flexible elastic cord secured to said body and having an end can be extended outward from said body in order to engage said object, and means for attaching said end of said cord to said body when said cord is not in use which means maintains said cord in a taut condition along said body and away from said slot when said cord is not in use.

2. The apparatus of claim 1 further including a second spirit level vial secured to said body and having means for indicating when said slot is at a second orientation that is orthogonal to said predetermined orientation, wherein, said second spirit level vial includes means for visually indicating predetermined degrees of inclination of said slot relative to horizontal whereby said tool may be used to orient said object at a predetermined grade relative to horizontal.

3. The apparatus of claim 1 wherein said means for attaching said end of said cord to said body includes a hook secured to said end of said cord and wherein said body has an aperture for receiving said hook when said cord is not in use, said aperture being located to maintain said cord in said taut condition along said body when said hook is engaged therein.

4. The apparatus of claim 1 wherein at least a pair of said elastic cords are secured to said body at spaced apart locations therealong.

5. The apparatus of claim 1 wherein said first fastening means includes a first pair of axially movable fastener pins extending through said body at a first end region thereof, each of said first pair of pins being at an opposite side of the centerline of said slot, and further includes a second pair of axially movable fastener pins extending through said body at the opposite end region thereof, each of said second pair of pins being at an opposite side of the centerline of said slot, and wherein said apparatus further includes a pair of said elastic cords extending from said body at spaced apart locations therealong and hooks on the ends of said cords for enabling clasping of said object by said cords, said apparatus further including at least a pair of magnets disposed in said body adjacent said slot for magnetically clamping said body to a ferromagnetic object.

6. The apparatus of claim 1 wherein said body has a linear central handle region adapted to be grasped by an operator's hand and first and second linear arms which extend in opposite substantially co-linear directions from opposite ends of said handle region, the centerline of said first and second arms being offset towards said one side of said body relative to the centerline of said handle region and being substantially parallel to the centerline of said handle region, said body further having a first pair of members which extend outward from the end of said first linear arm at right angles to each other and which jointly define a first segment of said slot, said body having a second pair of members which extend outward from the end of said second linear arm at right angles to each other and which jointly define a spaced apart second segment of said slot said slot being discontinuous between said first and second segments thereof.

7. The apparatus of claim 6 wherein a pair of said spirit level vials are secured to said body and are oriented to indicate when said slot is vertical, said pair of spirit level vials being of the bullseye type and each being secured to an opposite end of said handle region of said body and being faced in opposite directions.

8. The apparatus of claim 7 further including an additional pair of spirit level vials each being secured to a separate one of said arms of said body and being oriented to indicate when said slot is in a horizontal orientation.

9. A self-supported tool for assuring that an object has a predetermined orientation, comprising:
an elongated body having a linear slot of angled cross sectional configuration at one side and into which a portion of said object may be received when said body is abutted thereagainst, wherein said body has a linear central handle region adapted to be grasped by an operator's hand and first and second linear arms which extend in opposite substantially co-linear directions from opposite ends of said handle region, the centerline of said first and second arms being offset towards said one side of said body relative to the centerline of said handle region, and being substantially parallel to said centerline of said handle region, said body further having a first pair of members which extend outward from the end of said first linear arm at right angles to each other and which jointly define a first segment of said slot, said body having a second pair of members which extend outward from the end of said second linear arm at right angles to each other and which jointly define a second segment of said slot, and wherein each of said arms of said body has a passage extending thereacross in the vicinity of said handle region,
at least one spirit level vial secured to said body and having means for indicating when said slot is at said predetermined orientation,
first fastening means for temporarily securing said body to said object by penetration of fasteners into said object,
further including first and second elastic cords each extending through a separate one of said passages and each having a hook at each end, and wherein said body has a pair of apertures in the vicinity of each end thereof for receiving said hooks when said cords are not in use, said apertures being located to hold said cords taut against the sides of said body when said hooks are engaged in said apertures.

10. A self supporting plumbing tool for abutment against an object to determine if the object is in a predetermined orientation, comprising:
an elongated body having a linear slot of angled cross section at one side into which at least a portion of said object may be received when said tool is abutted thereagainst,
a spirit level vial secured to said body and being positioned thereon to indicate when said slot is in said predetermined orientation, and
at least one elastic cord secured to said body and having an end which can be extended outward from said body to clasp said body to said object and having means for securing said end of said cord to said body at a predetermined location thereon when said cord is not in use which means maintains said cord in a taut condition along said body and away from said slot when said cord is not in use.

11. A self-supported level, plumb and grading tool for indicating when an object is in a horizontal orientation or a vertical orientation or is inclined at at least one predetermined angle relative to horizontal, comprising:
an elongated body having a linear central handle region and co-linear arms extending from opposite ends of the handle region, each of said arms having a pair of members that extend laterally from the end of the arm at right angles to each other and which jointly define a slot into which a portion of said object may be received when said body is abutted against said object, each of said members being transpierced by a pin passage,
a first spirit level vial secured to said body and being oriented to indicate when said slot is in said vertical orientation,
a second spirit level vial secured to said body and being oriented to indicate when said slot is in said horizontal orientation and having means for indicating when said slot is at said at least one predetermined angle relative to horizontal,
a plurality of said pins each extending through a separate one of said passages of members and being movable relative to said passages in order to be selectively penetratable into said object to hold said body thereon,
at least one magnet secured to said body adjacent said slot, and
a pair of elastic cords each extending from a separate one of said arms and each having means for securing the end of the cord to cause said cord to clasp said object, and
means for maintaining said cords in a taut condition along said arms and away from said slot when said cords are not in use.

* * * * *